(No Model.)
G. W. GORDON.
MILK AND FOOD SAFE.
No. 315,770. Patented Apr. 14, 1885.
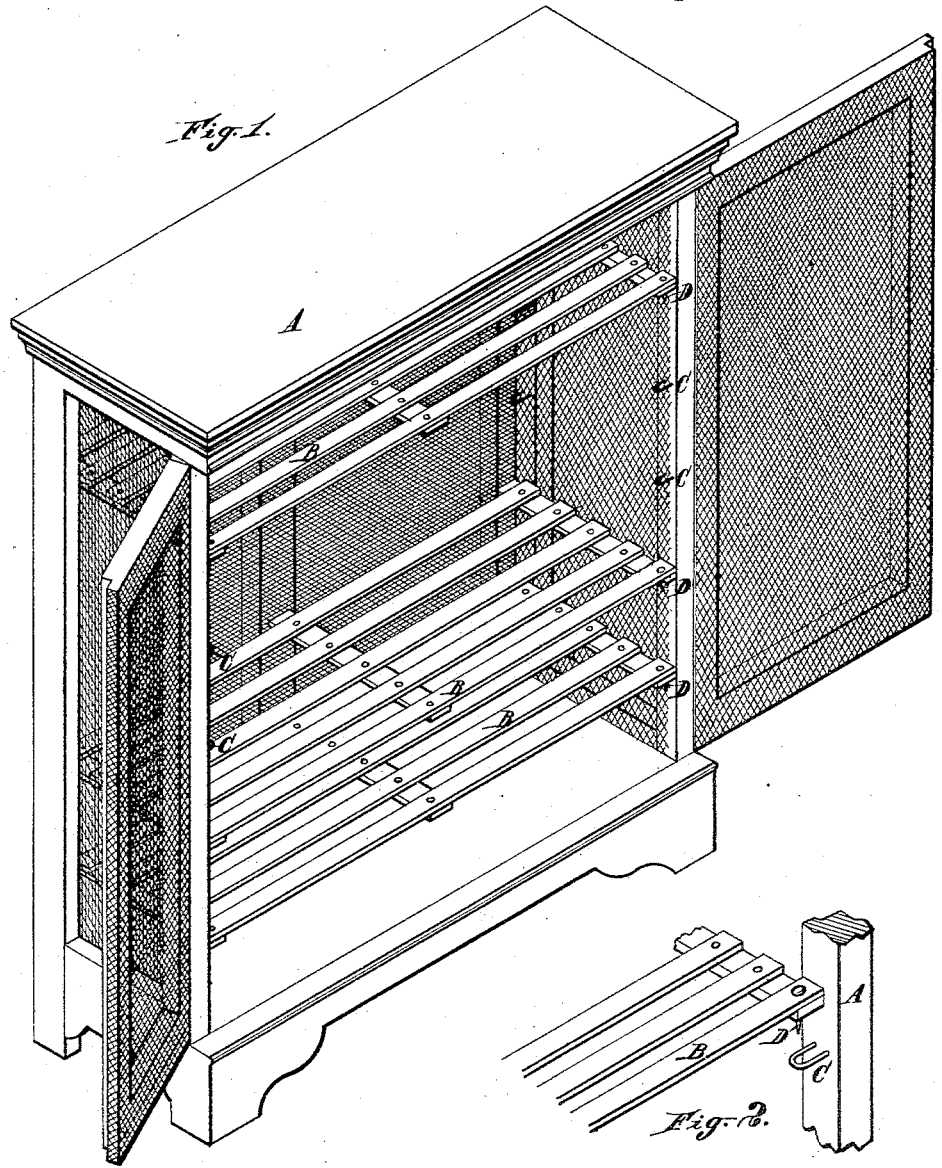

UNITED STATES PATENT OFFICE.

GEORGE WHITE GORDON, OF DETROIT, MICHIGAN.

MILK AND FOOD SAFE.

SPECIFICATION forming part of Letters Patent No. 315,770, dated April 14, 1885.

Application filed September 3, 1884. (No model.)

*To all whom it may concern:*

Be it known that I, GEORGE WHITE GORDON, of Detroit, county of Wayne, State of Michigan, have invented a new and useful Improvement in Milk and Food Safes; and I declare the following to be a full, clear, and exact description of the invention, such as will enable others skilled in the art to which it appertains to make and use it, reference being had to the accompanying drawings, which form a part of this specification.

My invention consists of the combinations of devices and appliances hereinafter specified, and more particularly pointed out in the claim.

In the drawings, Figure 1 is a perspective view of an improved milk and food safe with some of the shelves removed. Fig. 2 is a separate enlarged view illustrating more clearly the method of securing the shelves in place.

It is the object of my invention to produce a safe which shall have stationary shelves supported at their corners without cleats extending across beneath the ends of the shelves, the purpose being to permit the ready removal and cleansing of the shelves without there being upon the inside of the safe stationary cleats to become foul.

Safes have heretofore been made with rotary shelves, which, being detached from the side of the safe, were readily rotated and could be thoroughly cleansed; but rotary shelves are very objectionable where a safe is to be employed as a milk-safe, or where milk-pans are apt to be located upon different shelves, for the reason that with a rotary shelf it is necessary to rotate the shelves in order to gain access to any particular pan, and this rotation disturbs all of the pans, and thus prevents the proper rising of the cream. On the other hand, where shelves have been made stationary they have been held in place at the ends or sides of the safe by stationary cleats, upon which the shelves rest. This permits access to any shelf without disturbing the others; but in removing any shelf to cleanse it the cleat is left upon the inside of the safe, and may, and invariably does, become foul, so as eventually to produce an odor and taint the milk or other food within the safe.

In carrying out my invention, A represents the safe, which I prefer to make with screen doors and sides, so as to permit of ventilation. This is not absolutely necessary, however, for the doors and sides of the safe may be made of glass, where ventilation is not essential, or may be ventilated through other means.

B represents the shelves. I prefer to make them slatted, as shown, in order to facilitate ventilation and circulation within the safe. At the same time they serve to make a lighter safe, though I would have it understood that these shelves may be made solid, if desired, and may be of wood or metal.

Instead of employing supporting-cleats at the ends of the shelves, I provide simply corner supports, C. These corner supports may be blocks of wood; but I prefer to employ simply an open U-shaped staple or ring-staple, and then I provide the shelf with pins D, which project into the loop of the staple, and so hold the shelf firmly in place, but permit of its being easily detached by simply lifting the pins out of the staples. It is not really necessary that these pins should enter the staples at the four corners of the shelf, for the rear corners may simply rest on the staples and the forward corners alone be provided with the engaging-pin.

Heretofore difficulty has been experienced from the gnawing of mice and rats, more particularly at the base of the doors of the safe and at their corners along the lower part of the doors. To overcome this difficulty, I prefer to extend the screen upon the inside of the doors flush with the edges of the door-frame. I prefer not only to extend the screen-work to the edges of the door, but turn it back over the edges. The edges may be beveled slightly or rabbeted to prevent friction.

I do not limit myself to the application of the screen-work in this manner to the doors alone, as it may be extended in a similar manner over the inner surface and the edges of the entire frame, thus producing a safe proof against mice, rats, and other vermin.

By constructing safes as described I obtain the largest possible capacity, together with the greatest amount of ventilation.

What I claim is—

A milk or food safe having walls or sides of open screen or reticulated work, open staples in the corner posts thereof, and removable shelves formed of open slat-work supported at the desired points by said open staples, substantially as described.

In testimony whereof I sign this specification in the presence of two witnesses.

GEORGE WHITE GORDON.

Witnesses:
N. S. WRIGHT,
M. B. O'DOGHERTY.